Figure 1:
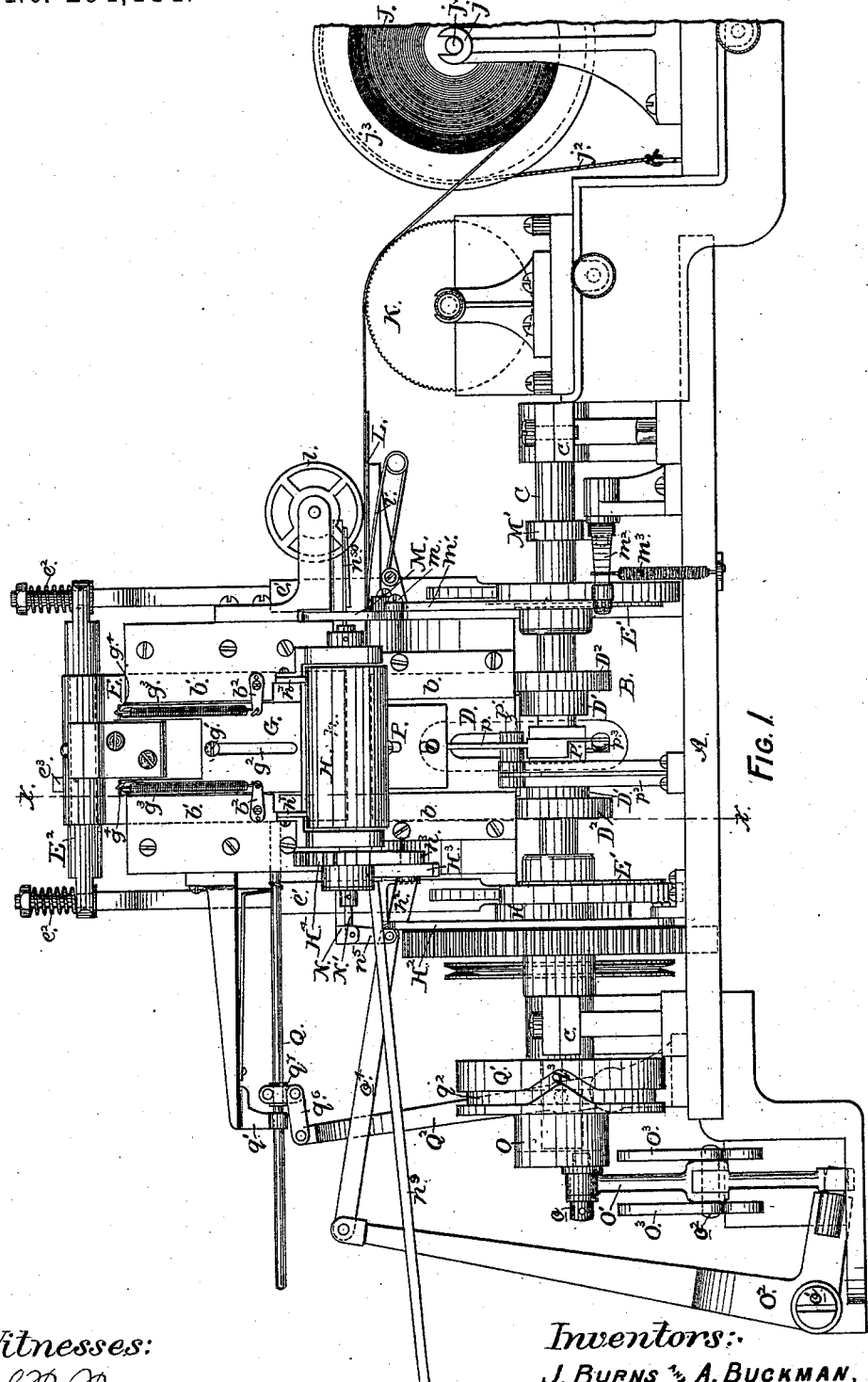

(No Model.) 9 Sheets—Sheet 1.

J. BURNS & A. BUCKMAN.
MACHINE FOR MAKING CIGARETTES.

No. 294,114. Patented Feb. 26, 1884.

Witnesses:
S. B. Brewer.
Geo. Low.

Inventors:
J. Burns & A. Buckman,
by William H. Low.
Attorney (No Model.) 9 Sheets—Sheet 3.

J. BURNS & A. BUCKMAN.
MACHINE FOR MAKING CIGARETTES.

No. 294,114. Patented Feb. 26, 1884.

Witnesses:
S. B. Brewer
Geo. Low

Inventors:
James Burns and
Alex Buckman,
by William N. Low,
Attorney.

(No Model.) 9 Sheets—Sheet 4.
J. BURNS & A. BUCKMAN.
MACHINE FOR MAKING CIGARETTES.

No. 294,114. Patented Feb. 26, 1884.

Witnesses:
S. B. Brewer
Gro. Low

Inventors:
JAMES BURNS AND
ALEX. BUCKMAN,
by William H. Low,
Attorney.

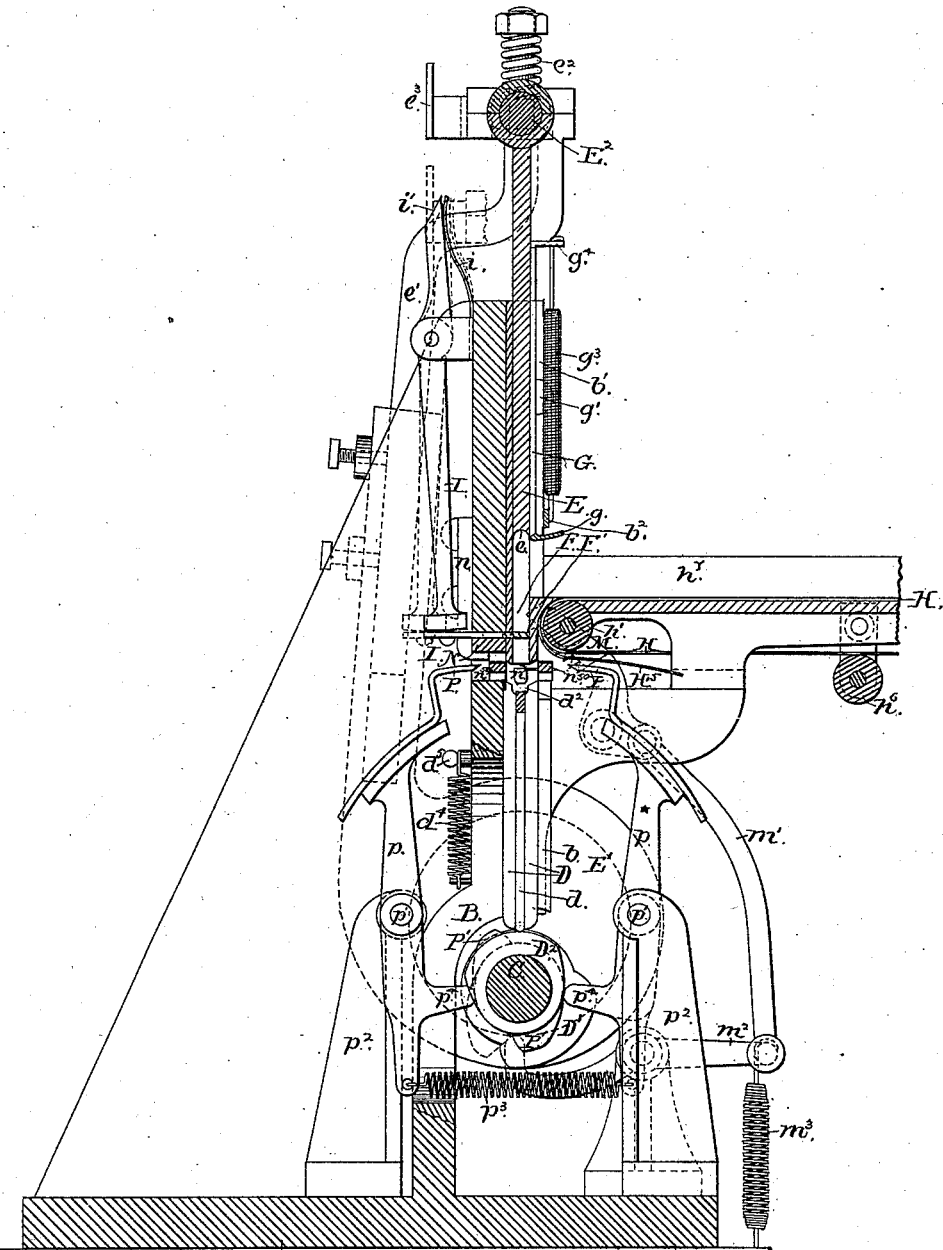

(No Model.)  
9 Sheets—Sheet 6.

J. BURNS & A. BUCKMAN.
MACHINE FOR MAKING CIGARETTES.

No. 294,114.  Patented Feb. 26, 1884.

Witnesses:
S. B. Brewer.
Geo. Low

Inventors:
James Burns and
Alex. Buckman,
by
William N. Low
Attorney.

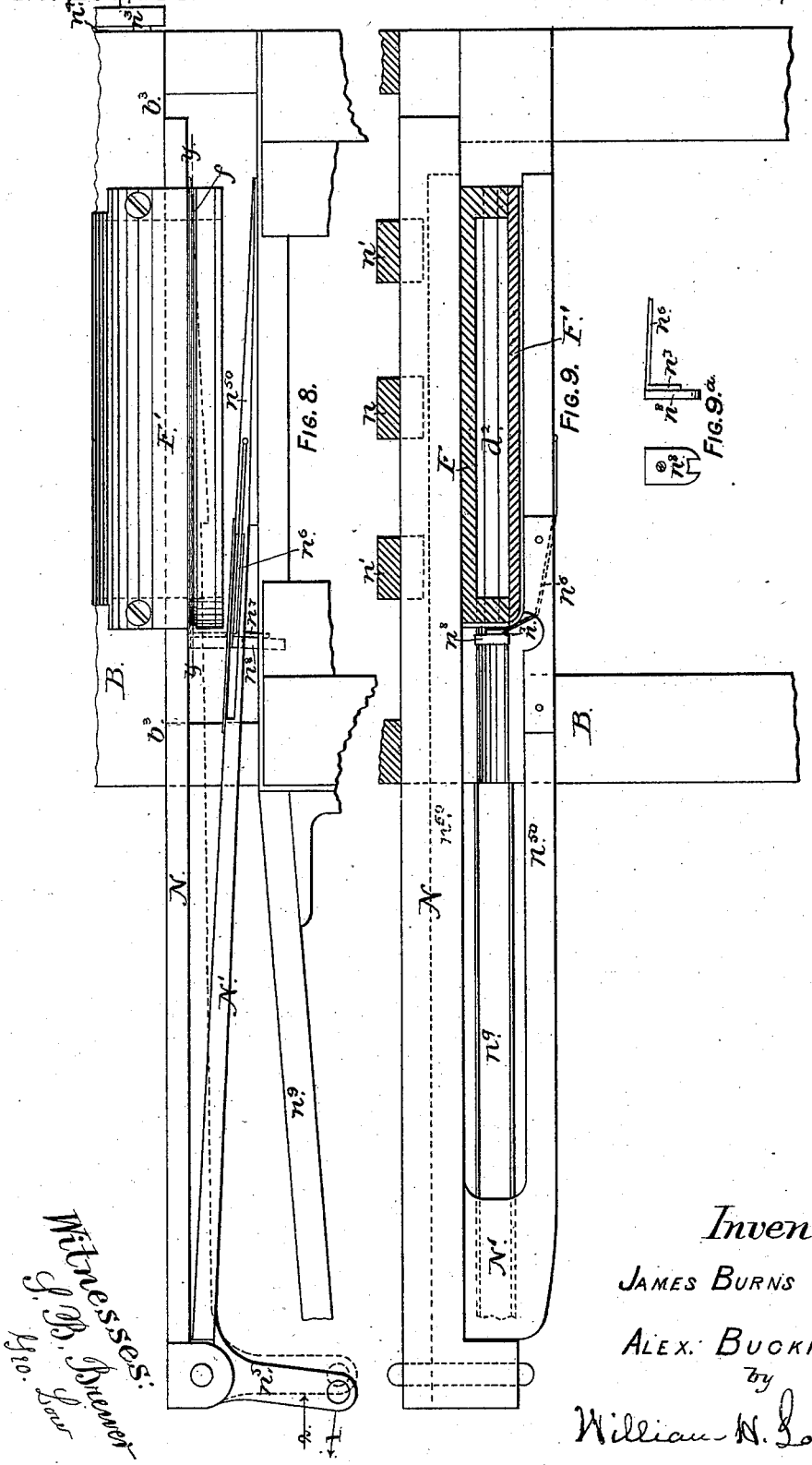

(No Model.) 9 Sheets—Sheet 8.

J. BURNS & A. BUCKMAN.
MACHINE FOR MAKING CIGARETTES.

No. 294,114. Patented Feb. 26, 1884.

Witnesses:
S. B. Brewer,
Geo. Low

Inventors:
James Burns and
Alex. Buckman,
by
William N. Low,
Attorney.

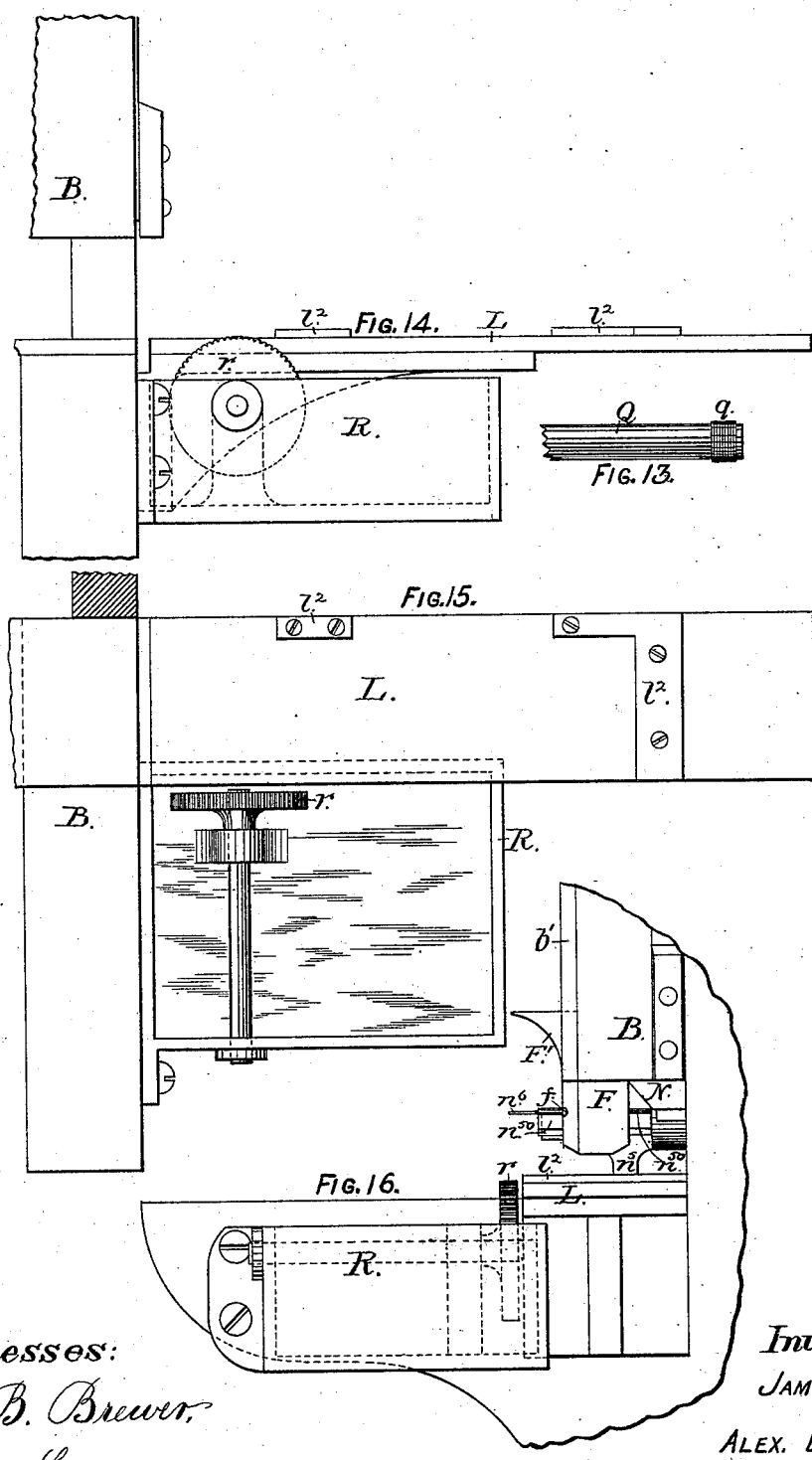

UNITED STATES PATENT OFFICE.

JAMES BURNS, OF BROOKLYN, AND ALEXANDER BUCKMAN, OF SCHODACK DEPOT, NEW YORK, ASSIGNORS OF TWENTY-TWO FORTIETHS TO ABRAM L. SCHERMERHORN AND JOHN S. BAKER, BOTH OF STUYVESANT, AND JAMES R. DOWNER AND FRANK P. HARDER, BOTH OF CASTLETON, NEW YORK.

MACHINE FOR MAKING CIGARETTES.

SPECIFICATION forming part of Letters Patent No. 294,114, dated February 26, 1884.

Application filed June 20, 1883. (No model.)

*To all whom it may concern:*

Be it known that we, JAMES BURNS, of Brooklyn, in the county of Kings and State of New York, and ALEXANDER BUCKMAN, of Schodack Depot, in the county of Rensselaer and State of New York, have invented certain new and useful Improvements in Cigarette-Machines, of which the following is a specification.

Our invention relates to improvements on machines for manufacturing cigarettes; and it consists of the hereinafter-described mechanisms for effecting the following operations: The wrapper is drawn into the machine, receiving in its course a narrow line of adhesive material near one of its edges, and when used from a continuous strip it is cut off into the required lengths. The tobacco—spread upon an endless belt—is fed into the machine beneath an upper die having a reciprocating motion. The said die serves as a shear for cutting off the required charge of tobacco, which is forced downward and delivered upon the piece of wrapper that is lying in position to receive it. The piece of wrapper and the charge of tobacco are, by the continued movement of the upper die, forced into a groove in the lower die, whereby the charge of tobacco is molded into its proper form. The edges of the wrapper are folded over and adhered by automatic folders, and the finished cigarette is discharged from the lower die coincidently with the introduction of another piece of wrapper for a repetition of the operations just described.

Figure 2:
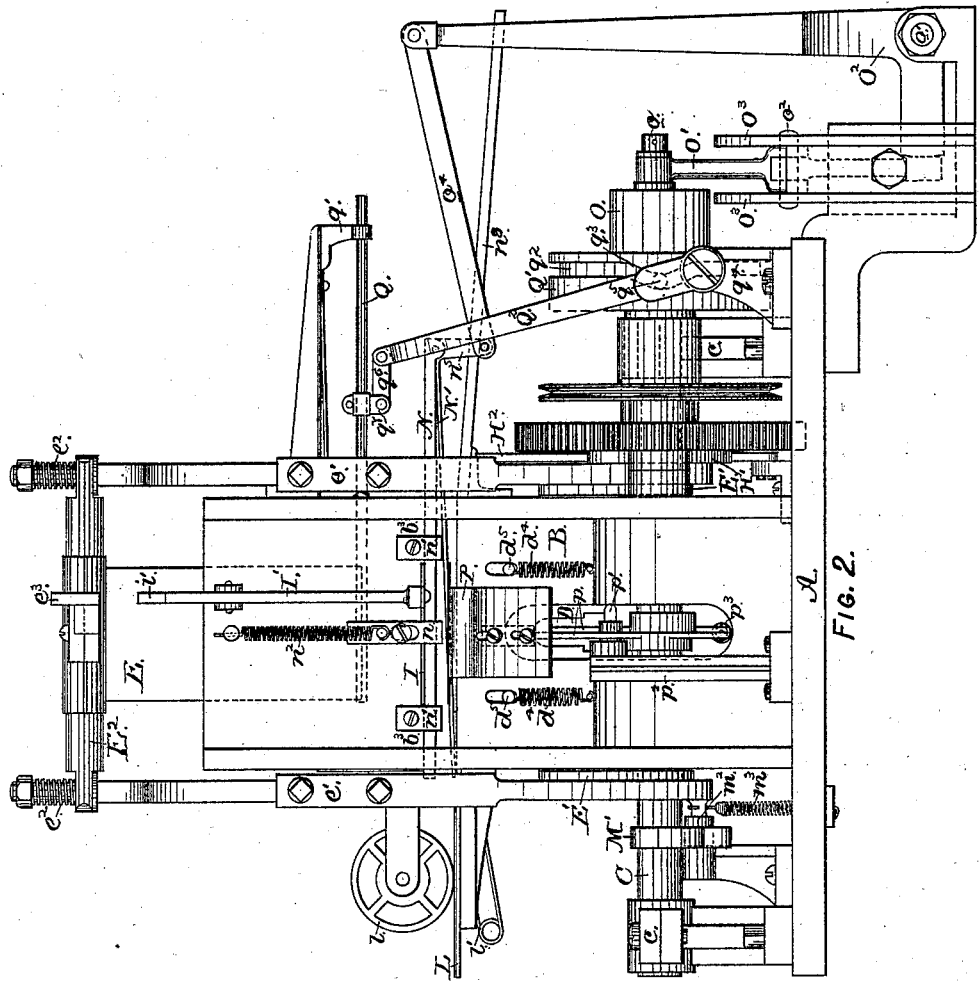
Figure 3:
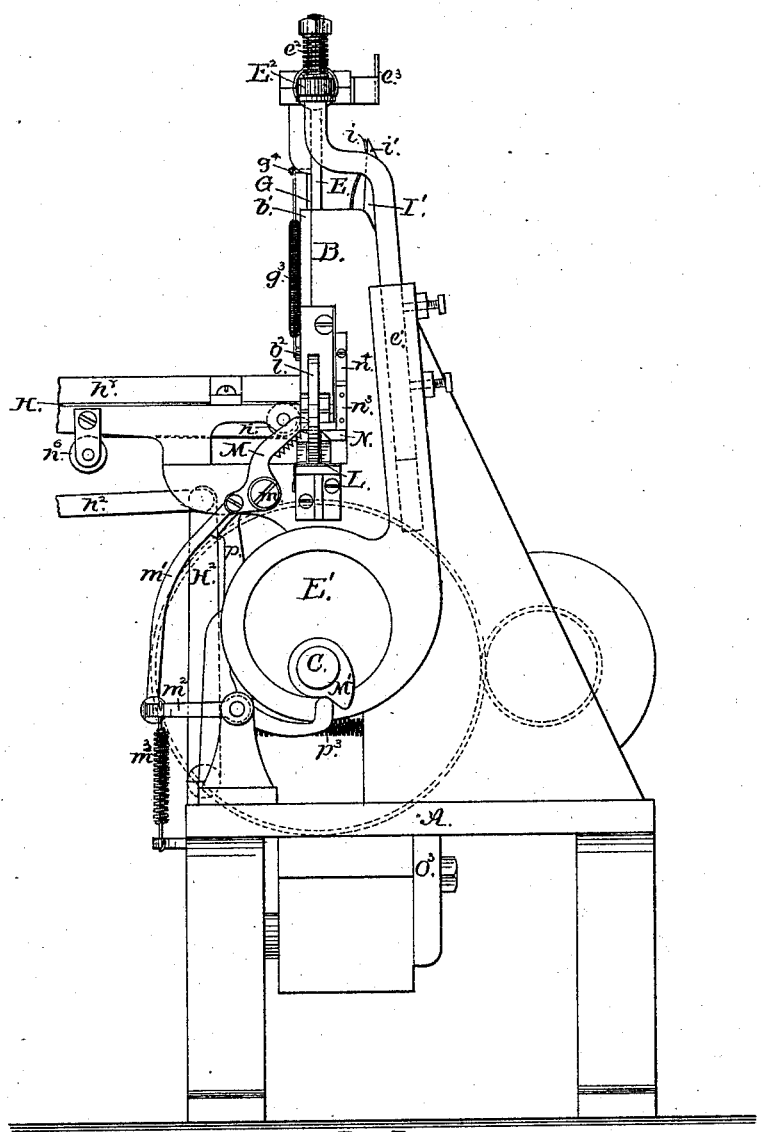
Figures 4, 17:
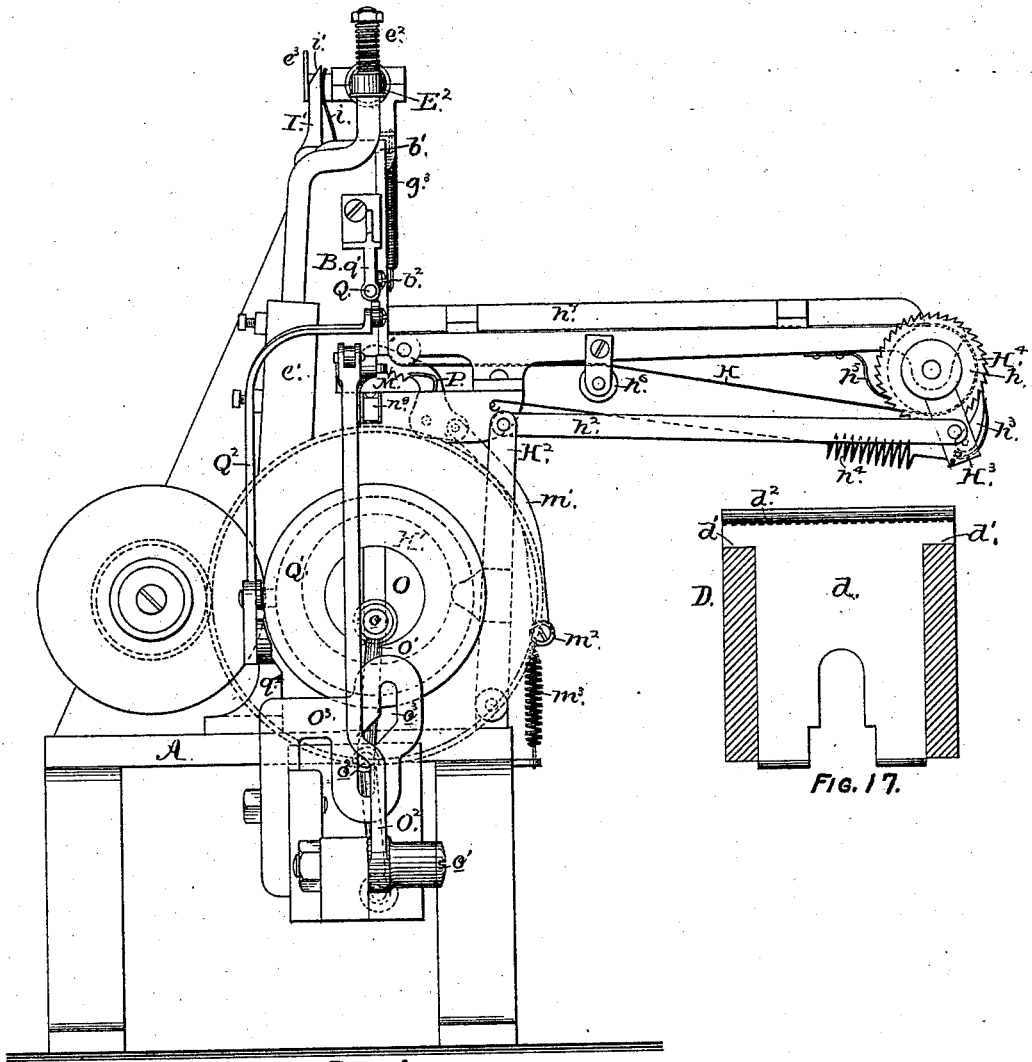
Figure 6:
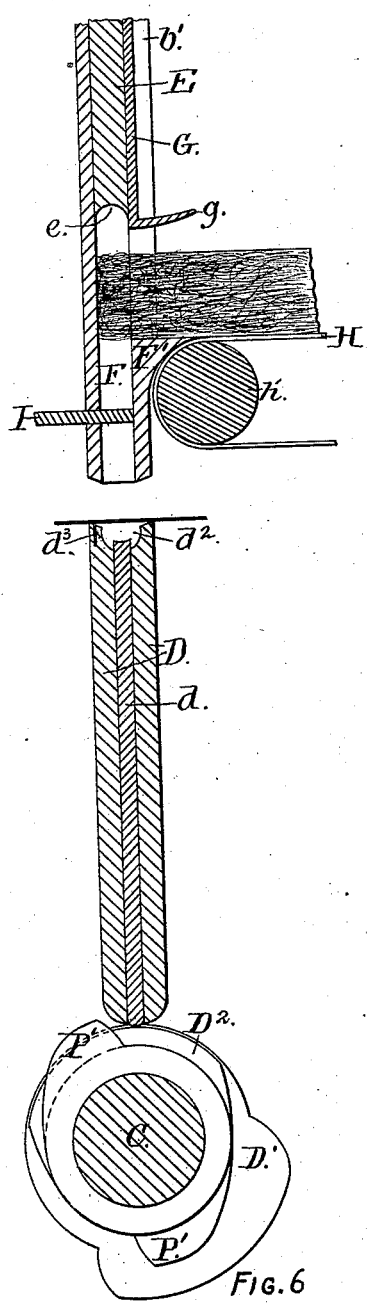
Figure 7:
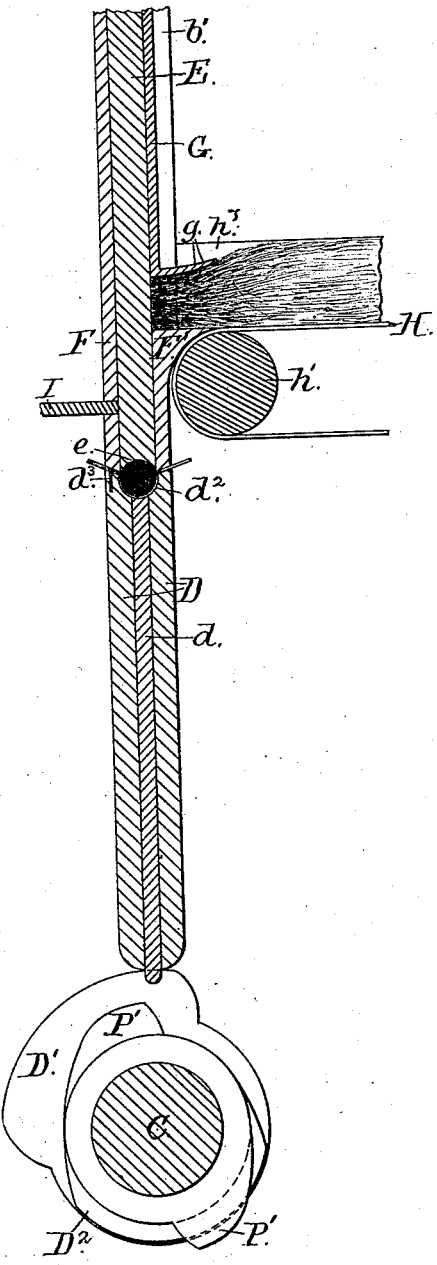
Figure 12:
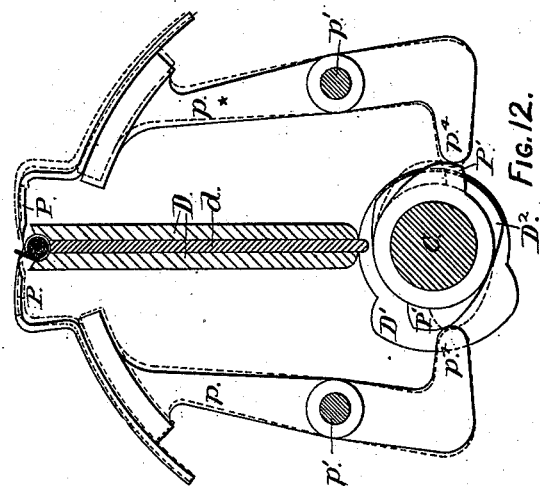
Figure 11:
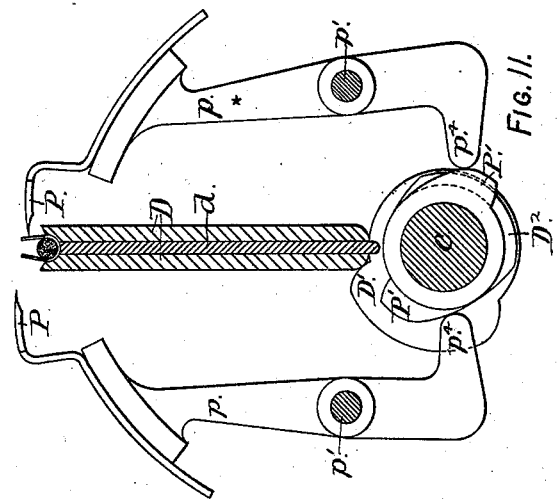
Figure 10:
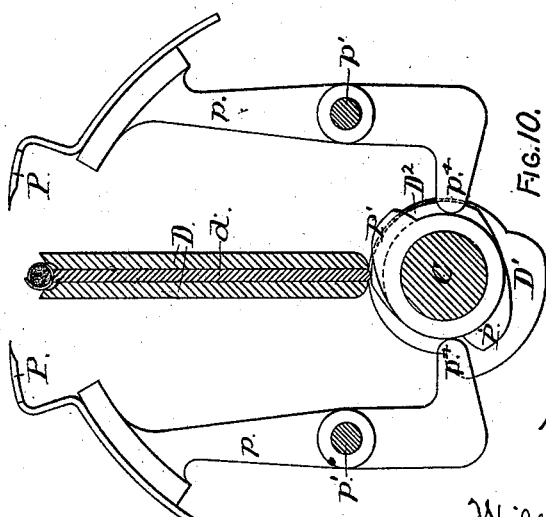

In the accompanying drawings, which form part of this specification, and to which reference is made herein, Figure 1 is a front elevation of our machine; Fig. 2, a rear elevation; Fig. 3, an elevation of the end nearest to the wrapper holding and pasting devices; Fig. 4, an elevation of the opposite end; Fig. 5, a transverse section on the line $x\ x$ of Fig. 1; Figs. 6 and 7 are enlarged details of the tobacco shearing and compressing mechanisms in different positions—the first showing the tobacco entering into the machine beneath the upper die, with a piece of wrapper resting on the top of the bed-die and ready to receive its charge of tobacco, and the other showing the relative disposition of the parts while the charge of tobacco is being compressed; Fig. 8, an enlarged front elevation of the wrapper-feeding mechanism and box for the lower end of upper die; Fig. 9, a plan view of the same, with the box shown in section at the line $y\ y$; Fig. $9^a$, details of the combined ejector and wiper attached to the wrapper-feeding mechanism. Figs. 10, 11, and 12 are detached details, showing the bed-die and folders and the devices for actuating them; Fig. 13, detail showing the inner end of the wiper for cleaning the lower end of the upper die. Figs. 14, 15, and 16 are respectively a front elevation, plan view, and end elevation of the pasting device used for adapting our machine to the manufacture of cigarettes with wrappers of leaf-tobacco or with wrappers of other material cut to size before they are inserted in the machine; and Fig. 17, a detached front elevation of the bed-die with its front removed for the purpose of showing the sliding plate.

As illustrated in the drawings, the principal frame-work of our machine consists of a bed-piece, A, and standard B, either of which may be made in the form shown, or any other that is suited to the purpose, and the said standard may be made either integral with the bed-piece or of a separate piece to be bolted upon said bed-piece. The main shaft C is arranged to rotate in bearings $c$, that are fixed or formed upon the bed-piece A. The said shaft may be driven by hand or other suitable power.

In the lower part of the standard B a bed-die, D—in which the cigarette is molded and formed—is arranged to reciprocate vertically in the guides $b$. The said bed-die is made in the form of an oblong box, open at the top and bottom, and containing a sliding plate, $d$, which forms part of said bed-die while the cigarette is being molded, but which—by extending below the bed-die—is adapted to be moved independently of said bed-die, for the purpose of discharging the finished cigarette from the groove of the bed-die. The sliding plate $d$, while operating as part of the bed-die D, is sustained by its shoulders $d'$, which rest upon seats formed for that purpose in the bed-die. A groove, $d^2$, for containing the cigarette during the several stages of its manufacture, is formed in the upper end of the bed-die and its sliding plate. The said groove extends across the entire width of the bed-die, and its transverse section forms a little more than a semicircle, so that an inturned edge will be formed at the opposite sides of said groove, for the purpose of securely holding the molded charge of tobacco and its wrapper in place until the cigarette is completed. The upper end of the bed-die D—at each side of the groove $d^2$—is beveled upward, and has near its rearmost side a strip, $d^3$, of india-rubber or other elastic material, inserted therein, for the purpose of securely clamping the cigarette-wrapper while said wrapper is receiving its charge of tobacco, in the manner hereinafter set forth.

In the upper part of the standard B an upper die, E, is arranged to reciprocate vertically in guides $b'$, so as to coincide exactly with the groove $d^2$ of the bed-die D. In the bottom of said upper die a concave groove, $e$, is made, whereby sharp edges are made on the front and rear faces of the bottom end of said upper die. The concavity of the groove $e$ conforms to that of the groove $d^2$ in the bed-die, and forms the complement to the circle of the last-named groove. The sharpened front edge of the bottom of the upper die, by coacting with the upper edge of a cross-bar, F'—which forms the front of a box, through which the lower part of the upper die, E, slides—produces at each downward stroke of said upper die a shearing cut for separating the required charge of tobacco from the incoming supply that is carried into the machine by the tobacco-feeding mechanism.

On the outer face of the upper die, E, there is a presser-plate, G, attached, by means of a screw-stud, $g'$, through a slotted opening, $g^2$, in such manner that the die E and plate G can each move independently when occasion requires.

On the lower end of the presser-plate G an outwardly-projecting flange, $g$, extends across its entire width, and the said presser-plate is forced downward by springs $g^3$, whose upper ends are connected to lugs $g^4$, (made on said presser-plate,) and whose lower ends are connected to the rigid arms $b^2$, that are fixed on the guides $b'$. The flange $g$ on the presser-plate is designed for the purpose of pressing down and holding in a compacted state the fibers of the tobacco while the upper die, E, is cutting off the required charge for filling a cigarette. On the upward stroke of the upper die, E—when the latter has moved a certain prescribed distance—the stud $g'$ engages against the upper end of the slotted opening $g^2$, and then, by the continued upward movement of the upper die, the presser-plate G will be raised to a sufficient height to permit the incoming supply of tobacco to pass freely into the machine, as shown in Fig. 6, beneath the raised upper die, E, whose lower end will then be a little above the lower face of the flange $g$. On the downward stroke of the upper die, E, the presser-plate G moves with it until the tobacco becomes so compacted that the further progress of said presser-plate will be prevented, and then the upper die, E—by its continued descent—shears off the charge of tobacco required for filling a cigarette, and forces it downward through an oblong box, F, of which the cross-bar F'—above referred to—forms the front side. The box F is made so that the lower end of the upper die, E, will slide snugly through it, and has its lower end beveled to receive the upper end of the bed-die D, as shown in Fig. 7, and the two ends should be so arranged that the wrapper will be clamped by the elastic strip $d^3$ at its rearmost edge, while the remainder of the wrapper will be left free to be drawn into the joint between the two dies, so that a sufficient quantity of the wrapper may be obtained to be depressed into the groove $d^2$ to receive the charge of tobacco carried thereinto by the action of the upper die, E.

Secured on the shaft C are the cams D' and $D^2$ and eccentrics E'. The cams D' are adapted to force the bed-die D upwardly until the latter is brought into contact with the box F, in the manner hereinabove described. The said bed-die is held in contact with the working-faces of the cams D' by means of the spiral springs $d^4$, which are connected to the studs $d^5$, that project from the back of the bed-die through slotted openings in the standard B. The downward stroke of the bed-die D is effected by means of the springs $d^4$. The cams $D^2$ are fashioned and arranged to raise at the proper moment the sliding plate $d$ and effect the dislodgment of the finished cigarette from the groove $d^2$ of the bed-die in such manner that the cigarette will be left in position to be acted upon by the ejecting device hereinafter described. The return-stroke of said sliding plate is produced by pressing the charge of tobacco into the groove $d^2$. The eccentrics E' are connected by means of the adjustable rods $e'$ to a cross-head, $E^2$, that is jointed to the top of the upper die, E. Springs $e^2$ are interposed between the nuts on the upper ends of the rods $e'$ and the cross-head $E^2$, for the purpose of limiting the degree of compression that will be applied by the upper die, E, in molding the charge of tobacco held in the wrapper lying in the groove $d^2$ of the bed-die. The movements of the bed-die D and upper die, E, must be so timed that the upper end of the bed-die will come in contact with the under face of the box F just before the descending upper die forces the charge of tobacco through said box, so as to deliver it into the piece of wrapper in the groove $d^2$.

The tobacco-feeding mechanism consists of the following parts: An endless apron, H, is carried by the rollers $h$ and $h'$, which are arranged in parallel lines at the opposite ends of the table over which said apron moves. The roller $h'$ is arranged directly in front of the cross-bar F' in such manner that the concavity of the projection on the front of said cross-bar will extend over that part of the endless apron that bends over the roller $h'$, and the upper face of said cross-bar will form a continuous plane with the upper face of said apron. An intermittent motion is given to the endless apron H in such manner that its upper part will be moved toward the standard B, so that the supply of tobacco which is placed thereon will be carried into the opening in said standard, beneath the upper die, E.

The means that we preferably employ to produce the said intermittent movement of the endless apron H consists of the following: A cam, H', is secured to the shaft C, to impart a vibratory motion to an arm, $H^2$. The moving end of said arm $H^2$ is connected by means of the rod $h^2$ to an arm, $H^3$, adapted to vibrate loosely on the shaft of the roller $h$. A spring-pawl, $h^3$, is pivoted to the arm $H^3$, and engages in the teeth of a ratchet-wheel, $H^4$, secured to the shaft of the roller $h$. A spring, $h^4$, is connected to the end of the arm $H^3$ and to any fixed part of the machine, so as to keep the arm $H^2$ in constant contact with the working-face of the cam H', and a detent-spring, $h^5$, engages in the teeth of the ratchet-wheel $H^4$, to prevent the roller $h$ from being rotated in a wrong direction.

The said tobacco-feeding mechanism operates in the following manner: With each revolution of the shaft C the cam H' compels the arms $H^2$ and $H^3$ to swing outwardly, and the spring-pawl $h^3$ forces the ratchet-wheel $H^4$ and its connected roller $h$ to make a partial revolution in such manner that the upper portion of the apron H and its supply of tobacco will move toward the opening beneath the upper die, E, hereinbefore referred to; and it must be understood that the parts should be so proportioned and adjusted that the necessary quantity of tobacco to fill one cigarette will be fed into the machine by each movement of the apron H. As soon as the throw of the cam H' permits, the spring $h^4$ will swing the arms $H^2$ and $H^3$ inwardly, thereby drawing back the spring-pawl $h^3$ to engage with other teeth on the ratchet-wheel $H^4$, and place the parts in position for a repetition of the feeding movement just described. A tightening-roller, $h^6$, is hung in adjustable bearings beneath the under part of the endless apron H, and affords the means for regulating the tension of said apron. The side plates, $h^7$, are fixed over the opposite edges of the apron H, the said side plates being arranged at such a distance apart as will conform to the width of the opening beneath the upper die, E, will guide the tobacco into said opening, and they will also prevent the tobacco from falling off at the edges of the apron H. The tobacco may be distributed in an even layer upon the endless apron H by hand, or by any suitable automatic mechanism. A guard-plate, $H^5$, is fixed beneath the inner end of the tobacco-feeding mechanism, for the purpose of preventing the fibers of tobacco from falling into the underlying parts and interfering with the proper action of those parts.

Provision is made for preventing any dust or fibers of the tobacco from falling into the groove $d^2$ in the bed-die, and for that purpose we employ an automatic cut-off composed of the following parts: A plate, I, is adapted to slide through an opening in the back of the box F, so as to entirely close the vertical opening through said box. The said plate is connected to the lower end of a lever, I', pivoted to the back of the standard B. A spring, $i$, exerts its pressure against the lever I', so as to move the plate I inwardly and close the vertical opening through the box F. For the purpose of moving the plate I in the opposite direction, a tripper, $e^3$, is attached to the upper part of the upper die, E, and said tripper is so arranged that when the upper die has descended a certain prescribed distance it (the tripper) will engage with the beveled end $i'$ of the lever I' and cause said lever to move into the position indicated by the dotted lines on Fig. 5, and thereby slide the plate I outwardly, so as to leave the vertical opening through the box F unobstructed, for the continued downward stroke of the upper die, E. On the upward stroke of said die, as the tripper $e^3$ passes off of the beveled end $i'$ of the lever I', the said lever will be forced by the spring $i$ to return to its normal position, whereby the plate I will be moved inwardly to reclose the vertical opening in the box F.

We usually make the wrapping material for the cigarettes in a continuous strip, that is formed into a roll, J, and fixed upon a shaft, $j$, that is carried in the bearings $j'$. The requisite tension upon the said strip is produced by means of a weighted cord, $j^2$, which is carried over the grooved wheel $j^3$. From the roll J the strip of wrapper (which may be made of paper or other suitable material) is carried over a pasting-wheel, K, which is fully shown and described in the Letters Patent of the United States, No. 259,090, granted to us on the 6th day of June, 1882, and by the said pasting-wheel a narrow line of adherent material is applied to the under side of the strip of wrapper near its outer edge. From the pasting-wheel the strip of wrapper is carried onto the wrapper-bed L, beneath a wheel, $l$, whose journals run in bearings that are made loose enough to permit the weight of said wheel to exert sufficient pressure to retain the free end of the strip in place until it is required to be fed into the machine. A delicate spring, $l'$, is fixed to the front side of the wrapper-bed L, so as to slightly elevate the pasted edge of the strip of wrapper and prevent it from smearing the upper face of said bed. An intermittently-vibrating knife, M—preferably made with a serrated cutting-edge—by coacting with the inner end of the wrapper-bed L, effects the severance of the strip of wrapper into the lengths required for making the finished cigarette. The knife M vibrates on the pivot $m$, and is connected by the rod $m'$ to a vibratory lever, $m^2$, which derives its motion (in one direction) from a cam, M', secured to the shaft C, and the said cam is so formed that it will cause the cutting movement of said knife to be made very rapidly, and so that when the knife has regained its elevated position it (the knife) will remain in a state of rest while the wrapper-feeding mechanism is performing its functions. A spring, $m^3$, is connected to the outer end of the lever $m^2$, so as to keep the opposite end of said lever in constant contact with the working-face of the cam M' and effect the upward movement of the knife M.

The wrapper-feeding mechanism is composed of the following parts: A horizontal sliding bar, N, is placed behind the box F, and is held in frictional contact against the shoulders $b^3$, formed on the standard B. The requisite friction on said sliding bar is produced by means of the hooked plates $n$ and $n'$, attached to the back of the standard and engaging under the sliding bar N. The hooked plate $n$ has slotted holes for receiving the screws by which it is attached to the standard B. A spring, $n^2$, secured to the plate $n$, and adjustably connected to a stud in the back of the standard B, exerts its force to press the sliding bar N into frictional contact with the shoulders $b^3$.

For the purpose of producing a greater resistance at the commencement of the inward movement of the sliding bar N, a block, $n^3$, of leather or other suitable material, is attached to a leaf-spring, $n^4$, that is secured to one side of the standard B in such manner that the lower end of the block $n^3$ will bear against the upper face of the sliding bar N. This device is so arranged that when the sliding bar is pushed outward the spring $n^4$ will yield without creating any friction upon the sliding bar; but on the return movement of said sliding bar the spring will be held to prevent its yielding, and the block $n^3$ will then exert its full pressure upon the sliding bar N. A bifurcated lever, N', is hinged to one end of the sliding bar N, as shown in Fig. 8, in such manner that the upper side of said lever will lie against the under side of the sliding bar. The two limbs $n^{50}$ of said bifurcated lever—when the latter is in its raised position—lie at the opposite sides—front and rear—of the box F. A pendent arm, $n^5$, is formed on the pivoted end of the bifurcated lever N', and the free ends of the limbs $n^{50}$ have on their under faces a facing of india-rubber or other suitable yielding material, that will form a close contact with the wrapping material and produce sufficient frictional adhesion therewith to enable the lever N' to draw said wrapping material into its place in the machine. The front limb, $n^{50}$, is adapted to receive a combined ejecting and cleaning device, that is composed of a spring, $n^6$, having at its free end a head, $n^7$, to which a facing, $n^8$, of felt, leather, or other suitable material is attached, and the said device is adapted to operate in the manner hereinafter explained.

A reciprocating movement is imparted to the sliding bar N in the following manner, or any other that is substantially the same: A slotted crank-wheel, O, is secured to the end of the shaft C, and is provided with an adjustable wrist-pin, $o$, a jointed connecting-rod, O', having one of its ends attached to the wrist-pin $o$ and its opposite end connected to the short arm of the bent lever $O^2$, which is adapted to vibrate on the stud $o'$. The joint-pin $o^2$ projects from opposite sides of the joint in the middle of the connecting-rod O', and the ends of said joint-pin engage in slotted openings $o^3$, formed in the stationary yokes $O^3$, for the purpose of governing the direction of the movement of said joints. The slotted openings $o^3$ have at or near the middle of them angular offsets, for the purpose of deflecting the joint in the connecting-rod O' from a direct line, so as to create a slight retardation or pause in the endwise movement of the connecting-rod while its joint-pin $o^2$ is passing through the offset portion of the slotted openings $o^3$. The upper end of the long arm of the bent lever $O^2$ is connected by the rod $o^4$ to the pendent arm $n^5$ of the bifurcated lever N'.

The operation of the above-described wrapper-feeding device is as follows: Taking as a starting-point the position of the several parts as shown in Fig. 1, in which the sliding bar N' is represented at the extremity of its outward movement, (toward the knife M,) and is about to commence its return or inward movement, it is obvious that the moment a drawing strain is applied to the pendent arm $n^5$, as indicated by the arrow 1 on Fig. 8, to draw the sliding bar N inwardly, the first effect of such a strain will be to force the free ends of the bifurcated lever N' downward, as shown by the full lines in Fig. 8, where its rubber-coated ends will come into close contact with the end of the strip of wrapper that is held, under the wheel $l$, on the wrapper-bed L. By the downward movement of the limbs $n^{50}$, the ejector $n^7$ will be carried down behind the outer end of the finished cigarette then lying in the groove $d^2$ of the bed-die D. By the continued movement of the sliding bar N and bifurcated lever N' in the direction indicated by arrow 1 on Fig. 8, the end of the strip of wrapper will be drawn into the machine until a sufficient length of said wrapper to cover a cigarette has been drawn toward the bed-die D. There then occurs a slight pause in the movement of the sliding bar N, (which pause is caused by the deflection of the rod O', as hereinbefore described,) and at that moment the knife M descends and severs the required piece of wrapper from the strip. The free end of said wrapper is retained beneath the wheel $l$, and the severed piece is carried—by the continued inward movement of the lever N'—to its place over the bed-die D. It will readily be seen that any increase of the frictional resistance to the movement of the sliding bar N must produce a proportionate increase of the pressure exerted by the ends of the limbs $n^{50}$ upon the wrapper, and consequently the said pressure may be increased or diminished as occasion requires. While the feeding movement of the bifurcated lever N is taking place, as above described, the ejector $n^7$—which, as before stated, has engaged with the outer end of the finished cigarette lying in the groove $d^2$—forces the said cigarette endwise from said groove before the newly-severed piece of wrapper is fed to its place over the bed-die D, and by the successive movements of the said ejector the finished cigarettes are pushed toward and into the spout $n^9$, and from the latter they may be discharged into any proper receptacle. On the completion of the movement of the sliding bar N in the direction above described, the crank-wheel O and intermediate mechanism will be in position to reverse the direction of the movement of the sliding bar N. The first effect of this change will be to convert the strain applied to the pendent arm $n^5$ from the drawing strain indicated by the arrow 1 on Fig. 8 to a thrusting one, as indicated by the arrow 2 on same figure. This will cause the bifurcated lever N' to swing up close to the under side of the sliding bar N, as indicated by the dotted lines on Fig. 8, before the sliding bar commences its return movement. By the upward movement of the bifurcated lever N', its two limbs $n^{50}$ will lie on the opposite sides—front and rear—of the box F, and the ejector $n^7$ will be behind the inner end of the said box. Then, as the bifurcated lever N' is pushed outward, the spring $n^6$, by engaging in the groove $f$ in the box F, will deflect the ejector $n^7$ outwardly, so that it will pass in front of the box F. When the ejector has passed by said box, the spring $n^6$ will restore the said ejector to its normal position between the limbs $n^{50}$, and on the termination of the movement of the sliding bar N in the direction last described the several parts will be in the positions they were in at the starting-point hereinabove referred to, and ready for a repetition of the operation above described. By means of the facing $n^8$, of leather or other material, fashioned to fit into the groove $d^2$ of the bed-die, the ejector $n^7$ is adapted to remove any particles of tobacco or other substance that may fall into the groove $d^2$, and the movement of said ejector for discharging the cigarettes will at the same time effect the cleaning of the groove $d^2$. When preferred, the facing $n^8$ may be omitted, and the device will then only be used for effecting the discharge of the cigarettes.

The wrapper-folding mechanism of our machine consists of the following: The folders P—which have the under sides of their adjacent edges hollowed out, as shown in Figs. 10, 11, and 12—have their uppermost edges arranged parallel to each other at opposite sides of the bed-die D. Said folders are secured to the upper ends of the levers $p$, which vibrate on the pivots $p'$, fixed in the standards $p^2$. The lower ends of said levers are connected together by the spring $p^3$, as shown in Fig. 5, so as to effect the opening movements of the folders P by means of said spring. The cams P', secured to the shaft C, are for imparting a closing movement to the folders P; and in order to effect that purpose each of the levers $p$ is provided with an inwardly-projecting arm, $p^4$, which bears against its appropriate cam, and is held in constant contact with the working-face thereof by the spring $p^3$. The pivotal centers $p'$ for said folders are so arranged that the working edges of the said folders, while moving toward the unfinished cigarette, will move downward through an arc of a circle, and by this arrangement each folder, while it is folding down its allotted edge of the wrapper, will, in addition to its folding movement, move in a downward direction to snugly press the edges of the wrapper upon the molded form of tobacco contained in said wrapper and held in the groove $d^2$. Several phases of the movements of the folders P are shown in detail in Figs. 10, 11, and 12, in which, for convenience of reference, the folder that is fixed in front of the bed-die D is marked with a star. In Fig. 10 said folders are shown in their normal or open positions, after having completed the folding of the wrapper around the cigarette that is shown raised up in the groove $d^2$ of the bed-die. In Fig. 11 the forward folder has just come in contact with the pasted flap of the wrapper and the back folder has just started on its movement toward the unpasted flap; and in Fig. 12 the full lines show the position of the two folders at the moment when the forward folder has completed its folding movement, in which position it is momentarily held until after the back folder is moved up into the position indicated by the dotted lines, to fold over the upper flap of the wrapper, at which point the back folder is in its turn held stationary for a moment, (or until the upper flap is adhered to the pasted flap of the wrapper,) during which time the forward folder will move back into the position indicated by the dotted lines at that part of the figure, after which both folders will be thrown back by the spring $p^3$ into their normal positions, as shown in Fig. 10.

From the foregoing it will be understood that the movements of the two folders P are so timed and arranged that the forward folder will move inwardly slightly in advance of the back folder, and so that the pasted (under or front) flap will be folded down first and held in place until the back folder has folded down the upper flap over and upon the pasted flap. The forward folder then recedes toward its normal position, while the back folder is held stationary for a moment while it is pressing down the upper flap on the pasted one, to produce a perfect adhesion of the two edges of the wrapper, after which the back folder in its turn recedes to its normal position.

Provision is made for removing any particles of tobacco and all gummy substances from the lower end of the upper die, E, by means of the following-described mechanism: A sliding rod or wiper, Q, is arranged to slide in a hole formed in the standard B, in line with the groove $e$ when the upper die, E, is at the highest point of its movement. At or near its inner end the wiper Q, as shown in Fig. 13, is provided with a head or band, $q$, composed of felt, yarn, leather, or other suitable material of a yielding or spongy nature. The outer end of said wiper is guided by a bracket, $q'$, secured to the side of the standard B, and the required motion is imparted to the wiper Q by a grooved cam, Q', secured to the shaft C. The said cam has a peripheral groove, $q^2$, that is cut in a direct line around said cam, excepting at the part $q^3$, where a V-shaped digression is made, for the purpose of producing a quick inward and outward movement of the wiper Q. An arm, $Q^2$, is pivoted to the bracket $q^4$, and provided with a stud, $q^5$, that engages with the groove $q^2$, to impart the required movement to the arm $Q^2$. The upper end of said arm is connected by means of a link, $q^6$, to lugs $q^7$ on the wiper Q.

The operation of this wiping mechanism is as follows: Just as the upper die, E, reaches the highest point of its stroke, the cam Q' causes the arm $Q^2$ to move the wiper Q in a very rapid manner inwardly and outwardly. During this movement the band $q$ is held in close contact with the groove $e$ in the lower end of the upper die, E, and effects the cleaning of said groove in a very perfect manner.

The operation of our machine may be summarized as follows: The piece of wrapper, having its edge pasted, is drawn into the machine—by the hereinbefore-described action of the wrapper-feeding mechanism—and lodged in place upon the upper end of the bed-die D. The said bed-die is then forced upward to clamp the piece of wrapper against the under side of the box F. A charge of tobacco has, during the operation just described, been carried by the endless apron H into the opening beneath the upper die, E. The said upper die then moves downward, cutting off the charge of tobacco, and forcing the said charge downward, with the piece of wrapper, into the groove $d^2$, wherein the tobacco and its wrapper are molded into proper shape for the finished cigarette. The upper die, E, is then forced upward, and the bed-die D is moved down to its lowest position. When the latter has been accomplished, the folders P—operating in the manner hereinbefore described—fold over the piece of wrapper around the molded charge of tobacco, and the edges of the wrapper adhere, thereby completing the formation of the cigarette. The sliding plate $d$ then moves upward to dislodge the finished cigarette from the groove $d^2$, and the next succeeding inward movement of the wrapper-feeding mechanism causes the ejector $n^7$ to push the finished cigarette endwise far enough to clear the bed-die D for a repetition of the operations just described.

To adapt this machine to the manufacture of cigarettes with wrapper of leaf-tobacco, or with any kind of wrapper that is cut to the required size before it is put into the machine, the knife M, its operating-lever $m^2$ and intermediate parts, the wheel $l$, and spring $l'$ should first be removed. The guide-stops $l^2$ must be fixed on the wrapper-bed L, for indicating the exact place for putting the pieces of wrapper, and the pasting device shown in Figs. 14, 15, and 16 must be attached to the machine in the position shown in said figures. The said pasting device consists of a reservoir, R—for containing any suitable adhesive material—and a narrow-faced pasting-wheel, $r$, preferably made with a serrated periphery. The said pasting-wheel should be adjusted to rotate in the reservoir R in such manner that the inner face of the pasting-wheel will lie at a slight distance from the outer edge of the wrapper-bed L, and the highest part of the periphery of said wheel should come a trifle above the surface of said wrapper-bed. All of the above-named parts should be so arranged that when a piece of wrapper is being drawn into the machine it will pass over the pasting-wheel $r$, which will, by its rotations, apply a narrow line of the adhesive material to the under side of the wrapper near one of its edges. The movement of the sliding bar N must be suitably increased to meet the requirements of this change, and this increase can be readily effected by means of the adjustable wrist-pin $o$ in the slotted crank-wheel O. The pieces of wrapper, cut to an exact size, are laid—one at a time—upon the wrapper-bed L, against the guide-stops $l^2$, and then the wrapper-feeding mechanism will operate, as hereinbefore explained, to draw the pieces of wrapper into the machine and effect the pasting of the edge of each piece of wrapper, in the manner set forth.

We claim as our invention—

1. In a cigarette-machine, the combination of a reciprocating bed-die, D, and sliding plate $d$, having a longitudinal groove, $d^2$, whose transverse form consists of a segment of more than a semicircle, as herein set forth, and a reciprocating upper die, E, having in its lower end a longitudinal concave groove, $e$, that will combine with the groove $d^2$ to form a complete circle, as herein described, with the means, substantially as specified, for reciprocating the said dies D and E toward and from each other, as and for the purpose herein set forth.

2. In a cigarette-machine, the combination, with a vertically-reciprocating bed-die, D, having a vertically-sliding plate, $d$—which forms part of said die—the die and plate having a longitudinal groove, $d^2$, consisting of more than a semicircle, as herein described, the cams D' and $D^2$, and springs $d^4$, for actuating said bed-die, of the folders P and mechanism, substantially as described, whereby the said folders are caused to turn over in consecutive order, first the pasted edge and then the unpasted edge of the wrapper, whereby the adhesion of the wrapper around the molded form of tobacco is effected, substantially as herein specified.

3. In a cigarette-machine, the combination, with a reciprocating bed-die, D, provided with a reciprocating sliding plate, $d$, and a tobacco-feeding mechanism, substantially as described, for feeding the tobacco into the machine, of a vertically-reciprocating upper die, E, arranged in relation to said bed-die, and having on its lower end a cutting-edge, as herein set forth, the cross-bar F', and mechanism, substantially as described, for reciprocating the dies D and E, in the manner and for the purpose herein specified.

4. In a cigarette-machine, the combination, with the box F and bed-die D, the latter containing a sliding plate, $d$—the said die and plate having a longitudinal groove, $d^2$, formed therein, as herein described—and the said die being provided with a strip, $d^3$, of yielding material, for clamping one edge of a wrapper between said box and die, as herein set forth, and mechanism, substantially as described, for feeding the tobacco into the machine, of the upper die, E, having a reciprocating movement, and adapted to sever a charge of tobacco from the incoming supply, and to force the said charge and its inclosing-wrapper into the groove $d^2$ of the bed-die D and sliding plate $d$, as herein specified.

5. In a cigarette-machine, a reciprocating bed-die adapted to retain a molded charge of tobacco and its inclosing-wrapper, folders for turning over and causing the edges of said wrapper to adhere, a reciprocating upper die adapted to cut off the required charge of tobacco and force it—with its inclosing-wrapper—down into the groove of the bed-die, and a sliding plate adapted to reciprocate in the bed-die, for the purpose of dislodging the finished cigarette from the groove in said bed-die, in combination with the mechanisms, substantially as shown and described, for reciprocating said bed-die, sliding plate, and upper die, and for actuating the said folders in the manner and order herein specified.

6. In a cigarette-machine, the combination, with the reciprocating bed-die D, reciprocating upper die, E, and folders P, as herein shown and described, of the mechanisms, substantially as described, for feeding in the wrapper and pasting the edge thereof, in the manner herein specified.

7. In a cigarette-machine, the combination, with a pasting-wheel, K, and wrapper-bed L, of the spring $l'$, arranged on the front edge of said wrapper-bed, for the purpose of raising the pasted edge of the wrapper, as herein specified.

8. In a cigarette-machine, the wrapper-feeding device, consisting of a sliding bar, N, frictionally retarded, substantially as set forth, and a bifurcated lever, N', pivoted to one end of the sliding bar N, and provided with a pendent arm, $n^5$, the said pendent arm being connected to mechanism for actuating the said wrapper-feeding mechanism in such manner that a combined vibratory and sliding movement will be imparted to the said bifurcated lever, as and for the purpose specified.

9. In a cigarette-machine, the combination, with a wrapper-feeding device consisting of the sliding bar N and a bifurcated lever, N', pivoted to said sliding bar, and adapted to operate as herein set forth, the wrapper-bed L, and vibrating knife M, of the bed-die D, upper die, E, folders P, and the several mechanisms, substantially as described, for actuating the said parts, in the manner specified.

10. In a cigarette-machine, the wrapper-feeding mechanism herein described, consisting of a sliding bar, N, and a bifurcated lever, N', pivoted to one end of said sliding bar, and provided with a pendent arm, $n^5$, for the purpose of giving to said bifurcated lever a combined vibratory and sliding movement, as herein set forth, in combination with an ejector, $n^7$, attached to the bifurcated lever N', and adapted to effect the discharge of the cigarettes, as herein specified.

11. In a cigarette-machine, the ejector $n^7$, provided with a facing, $n^8$, as herein described, the said ejector being adapted to reciprocate and to effect the cleaning of the groove $d^2$ of the bed-die D, in the manner herein specified.

12. In a cigarette-machine, the combination, with a tobacco-feeding mechanism, a reciprocating upper die, E, having the presser-plate G attached directly thereto, and a cut-off, I, and box F, all arranged to operate as herein described, of the several mechanisms, substantially as described, for actuating the said upper die and cut-off, in the manner herein specified.

13. In a cigarette-machine, the combination, with a reciprocating upper die, E, bed-die D, having the groove $d^2$, and folders P, adapted to move consecutively, as herein set forth, of the sliding plate $d$, adapted to dislodge the finished cigarette from the groove $d^2$, and the ejector $n^7$, as and for the purpose herein specified.

14. In a cigarette-machine, the reciprocating bed-die D, having a groove, $d^2$, that consists of a segment greater than a semicircle, whereby inturned edges are formed at the opposite sides of said groove, for the purpose of retaining the molded cigarette in place, and a sliding plate, $d$, adapted to dislodge the finished cigarette from the groove $d^2$, in the manner herein specified.

15. In a cigarette-machine, the wrapper-feeding mechanism, substantially as described, and consisting of a sliding bar, N, and a bifurcated lever, N', having the free end of its limbs $n^{50}$ faced on the under side with rubber or other elastic material, for producing a more perfect adhesion to the wrapper, the said bifurcated lever being pivoted to one end of the sliding bar N, and having at its pivoted end a pendent arm, $n^5$, as herein described, in combination with mechanism, substantially as described, whereby a combined sliding and vibratory movement is imparted to the bifurcated lever N', as and for the purpose herein specified.

16. In a cigarette-machine, the combination, with the lower die, D, and sliding plate $d$, having a longitudinal groove, $d^2$, as herein set forth, of the folders P and the mechanism, substantially as described, for actuating the said folders in such manner that they will first fold over one edge of the wrapper and hold it in place until the second edge is folded over and adhered to the first, in the manner herein specified.

17. In a cigarette-machine, the combination, with an upper die, E, having a groove, $e$, in its lower end, as herein described, of the reciprocating wiper Q, adapted to clean the groove $e$, in the manner herein specified.

JAMES BURNS.
    ALEXANDER BUCKMAN.

Witnesses:
 JOHN A. NEXSEN,
 WM. G. McILVAINE.